US010805536B2

(12) United States Patent
Chen et al.

(10) Patent No.: US 10,805,536 B2
(45) Date of Patent: Oct. 13, 2020

(54) VIDEO DOORBELL SYSTEM COMPATIBLE WITH VARIOUS ACCESSORIES (71) Applicant: Sercomm Corporation, Taipei (TW)

(72) Inventors: Chien-Ming Chen, Taipei (TW); Shiou-Hua Hu, Taipei (TW)

(73) Assignee: Sercomm Corporation, Taipei (TW)

(*) Notice: Subject to any disclaimer, the term of this patent is extended or adjusted under 35 U.S.C. 154(b) by 0 days.

(21) Appl. No.: 16/362,708

(22) Filed: Mar. 25, 2019

(65) Prior Publication Data

US 2019/0306432 A1 Oct. 3, 2019

Related U.S. Application Data (60) Provisional application No. 62/650,269, filed on Mar. 29, 2018.

(30) Foreign Application Priority Data

Jul. 13, 2018 (CN) .......................... 2018 1 0770962

(51) Int. Cl.
*H04N 5/232* (2006.01)
*H04N 7/18* (2006.01)
*G08B 3/10* (2006.01)
*G08B 13/196* (2006.01)

(52) U.S. Cl.
CPC .......... *H04N 5/232411* (2018.08); *G08B 3/10* (2013.01); *G08B 13/19695* (2013.01); *H04N 7/186* (2013.01)

(58) Field of Classification Search
CPC ..... H02J 7/00; H04N 7/186; H04N 5/232411; G08B 29/181
USPC .................................................. 348/142–160
See application file for complete search history.

(56) References Cited

U.S. PATENT DOCUMENTS

| 8,264,994 B2 | 9/2012 | Chan |
| 9,253,814 B1 | 2/2016 | Moncrief |
| 9,740,084 B1 | 8/2017 | Mar |

(Continued)

FOREIGN PATENT DOCUMENTS

| CN | 101064831 A | 10/2007 |
| CN | 101202499 A | 6/2008 |

(Continued)

OTHER PUBLICATIONS

SkyBell, SkyBell HD Wall Mount, http://www.skybell.com/products/accessories/, 2018.

(Continued)

*Primary Examiner* — Mainul Hasan
(74) *Attorney, Agent, or Firm* — Winston Hsu (57) ABSTRACT A video doorbell system comprising a video doorbell device, which comprises a chime trigger device, a first battery, an AC power receiving interface, an AC to DC circuit, a charging circuit, a DC power receiving interface and an image capture circuit. The first battery provides an internal DC voltage. The AC power receiving interface receives an AC voltage. The AC to DC circuit converts the AC voltage to a second DC voltage. The charging circuit drains the second DC voltage to charge the first battery. The DC power receiving interface receives a first DC voltage. The image capture circuit selectively drains the internal DC voltage, or the first DC voltage to operate.

17 Claims, 11 Drawing Sheets

(56) References Cited

U.S. PATENT DOCUMENTS

| | | | |
|---|---|---|---|
| 2007/0146477 A1* | 6/2007 | Lee | H04N 5/23241 |
| | | | 348/14.01 |
| 2011/0167281 A1* | 7/2011 | Rathi | G06F 1/26 |
| | | | 713/310 |
| 2016/0300476 A1 | 10/2016 | Kasmir | |
| 2017/0214843 A1 | 7/2017 | Boykin | |
| 2017/0272652 A1* | 9/2017 | Siminoff | H04N 5/23241 |
| 2018/0026452 A1* | 1/2018 | Kim | H02J 7/007 |
| | | | 307/131 |
| 2018/0267586 A1* | 9/2018 | Jung | H02J 7/008 |
| 2019/0149775 A1* | 5/2019 | Alamgir | G08B 25/06 |
| | | | 348/143 |

FOREIGN PATENT DOCUMENTS

| | | |
|---|---|---|
| CN | 101309297 A | 11/2008 |
| CN | 201601740 U | 10/2010 |
| CN | 102830304 A | 12/2012 |
| CN | 103444258 A | 12/2013 |
| CN | 105684407 A | 6/2016 |
| CN | 206575530 | 10/2017 |
| CN | 206743445 | 12/2017 |
| TW | 200726258 | 7/2007 |

OTHER PUBLICATIONS

Ring, Quick Release Battery Pack, https://shop.ring.com/products/quick-release-battery-pack, 2018.
Ring, Video door bell kit., 2018.

* cited by examiner

VIDEO DOORBELL SYSTEM COMPATIBLE WITH VARIOUS ACCESSORIES

CROSS REFERENCE TO RELATED APPLICATIONS

This application claims the benefit of U.S. Provisional Application No. 62/650,269, filed on 2018 Mar. 29, and claims priority to China Patent Application No. 201810770962.3, filed on 2018 Jul. 13. The contents thereof are incorporated herein by reference.

BACKGROUND OF THE INVENTION

1. Field of the Invention

The present invention relates to a video doorbell system, and particularly relates to a video doorbell system compatible with various accessories.

2. Description of the Prior Art

Since the cloud technology becomes popular and highly improved, video doorbells have become more and more popular. When a visitor presses the doorbell's button, the video doorbell records images of the visitor via its internal camera or transmits the real time images to the user's mobile phone, thereby the user can know who the visitor is.

A conventional video doorbell can be installed in a desired position through an accessory, thereby the video doorbell can have a proper orientation or angle. The video doorbell likely contains an internal battery to provide power to the image sensor, but the internal battery may not provide enough power due to various factors (such as weather, humidity, or battery aging), making the video doorbell not functions properly. The conventional accessories do not solve such problems.

SUMMARY OF THE INVENTION

Therefore, one objective of the present invention is to provide a video doorbell system compatible with different accessories.

One embodiment of the present invention discloses a video doorbell system comprising a video doorbell device, which comprises a chime trigger device, a first battery, an AC power receiving interface, an AC to DC circuit, a charging circuit, a DC power receiving interface and an image capture circuit. The first battery is configured to provide an internal DC voltage. The AC power receiving interface is configured to receive an AC voltage. The AC to DC circuit is coupled to the AC power receiving interface, and is configured to convert the AC voltage to a second DC voltage. The charging circuit is coupled to the AC to DC circuit and the first battery, and is configured to drain the second DC voltage to charge the first battery. The DC power receiving interface is configured to receive a first DC voltage. The image capture circuit is coupled to the first batter and the DC power receiving interface, and is configured to selectively drain the internal DC voltage, or the first DC voltage to operate.

Another embodiment of the present invention discloses a video doorbell device, which comprises: a chime trigger device; a battery, configured to provide an internal DC voltage; an AC power receiving interface, configured to receive an AC voltage; an AC to DC circuit, coupled to the AC power receiving interface, configured to convert the AC voltage to a second DC voltage; a charging circuit, coupled to the AC to DC circuit and the battery, configured to drain the second DC voltage to charge the battery; a DC power receiving interface, configured to receive a first DC voltage; and an image capture circuit, coupled to the battery and the DC power receiving interface, and is configured to selectively drain the internal DC voltage or the first DC voltage to operate.

In view of above-mentioned embodiments, the user can use different accessories for different situations, and the issue that the video doorbell device cannot function properly in some situations can be avoided.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, a plurality of embodiments are provided to explain the concept of the present invention. Also, in following embodiments, each component can be implemented by hardware (e.g. a circuit or a device), and can be implemented by firmware or software as well (e.g. install at least one program to a processor). Additionally, persons skilled in the art can understand each component in the embodiments can be divided into more components or be integrated to fewer components. Such variation should fall in the scope of the present invention. Additionally, the term "couple" in following embodiments can mean direct electrical connection or indirect electrical connection. The transmission of information can be direct transmission or indirect transmission.

Figure 1:
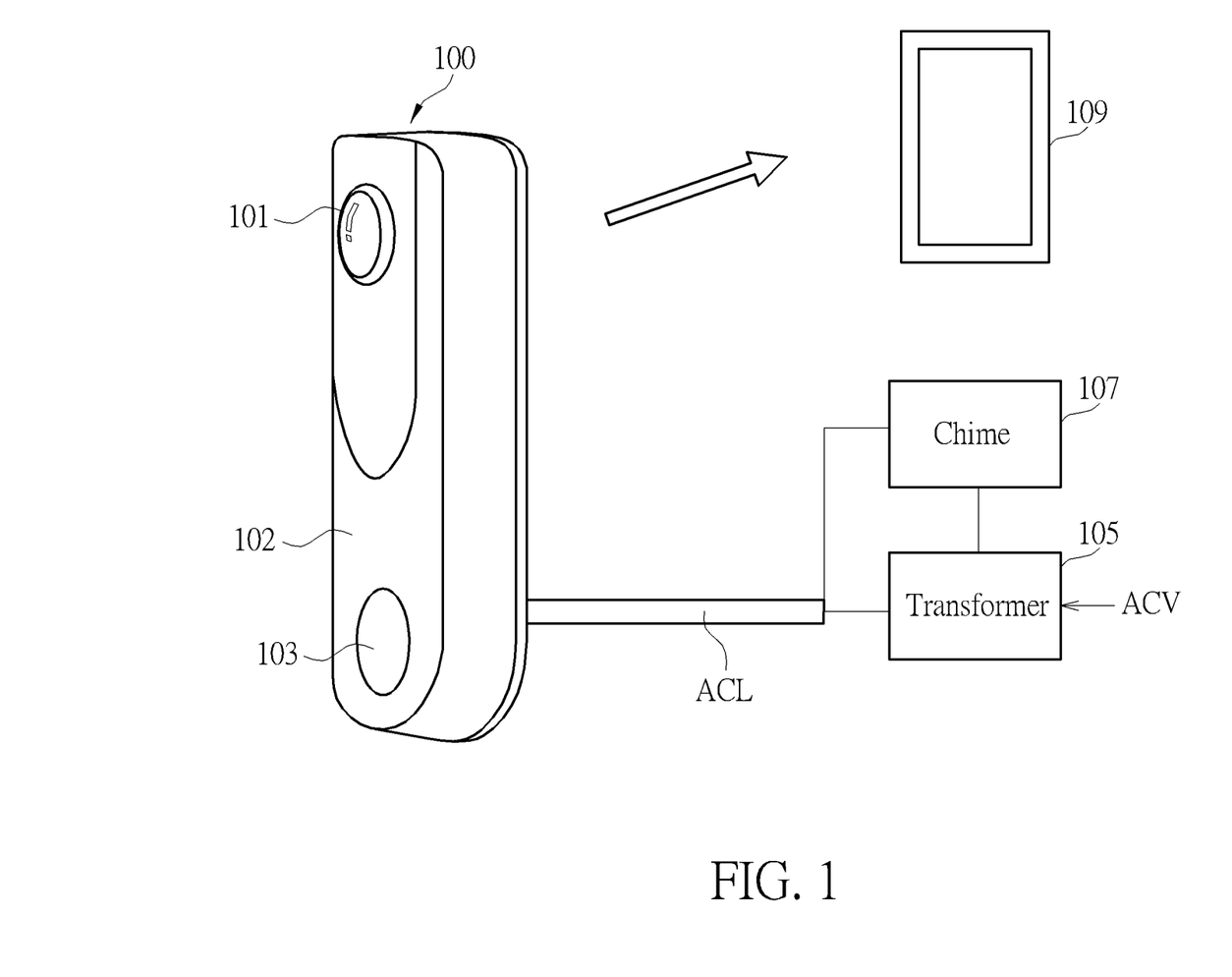
FIG. 1 is a schematic diagram illustrating a video doorbell system according to one embodiment of the present invention.

FIG. 1 is a schematic diagram illustrating a video doorbell system according to one embodiment of the present invention. As shown in FIG. 1, the video doorbell system comprises a video doorbell device 100, which comprises an image capture circuit 101 (e.g. an image sensor) and a chime trigger device 103 (e.g. a mechanical button or a capacitive touch panel). The chime trigger device 103 is connected to the chime 107 and the transformer 105 via an AC line ACL. The transformer 105 is configured to convert the AC voltage (e.g. mains) to an appropriate voltage for the chime 107 and the video doorbell device 100.

When the chime trigger circuit 103 is not triggered, the transformer 105 does not provide sufficient power to operate the chime 107. When the chime trigger circuit 103 is triggered, the chime 107 can receive sufficient power from the transformer 105 to operate. In such case, the image capture circuit 101 can also enter a work state to perform video recording or photographing, and the video doorbell device 100 can transmit real time images to the user's electronic device 109. However, when the image capture circuit 101 and the chime 107 are simultaneously in the work state, most of the power generated by the transformer 105 is consumed by the chime 107, so that the image capture circuit 101 cannot drain enough power from the transformer 105. Therefore, a conventional video doorbell device comprises an internal battery to provide necessary power for the image capture circuit 101. However, such arrangement is not suitable for every situation. Therefore, the video doorbell system provided by the present invention further provides various accessories besides the video doorbell device 100. Thereby the user can select a proper accessory corresponding to different situations, to make sure the video doorbell device can normally operate.

Figure 2:
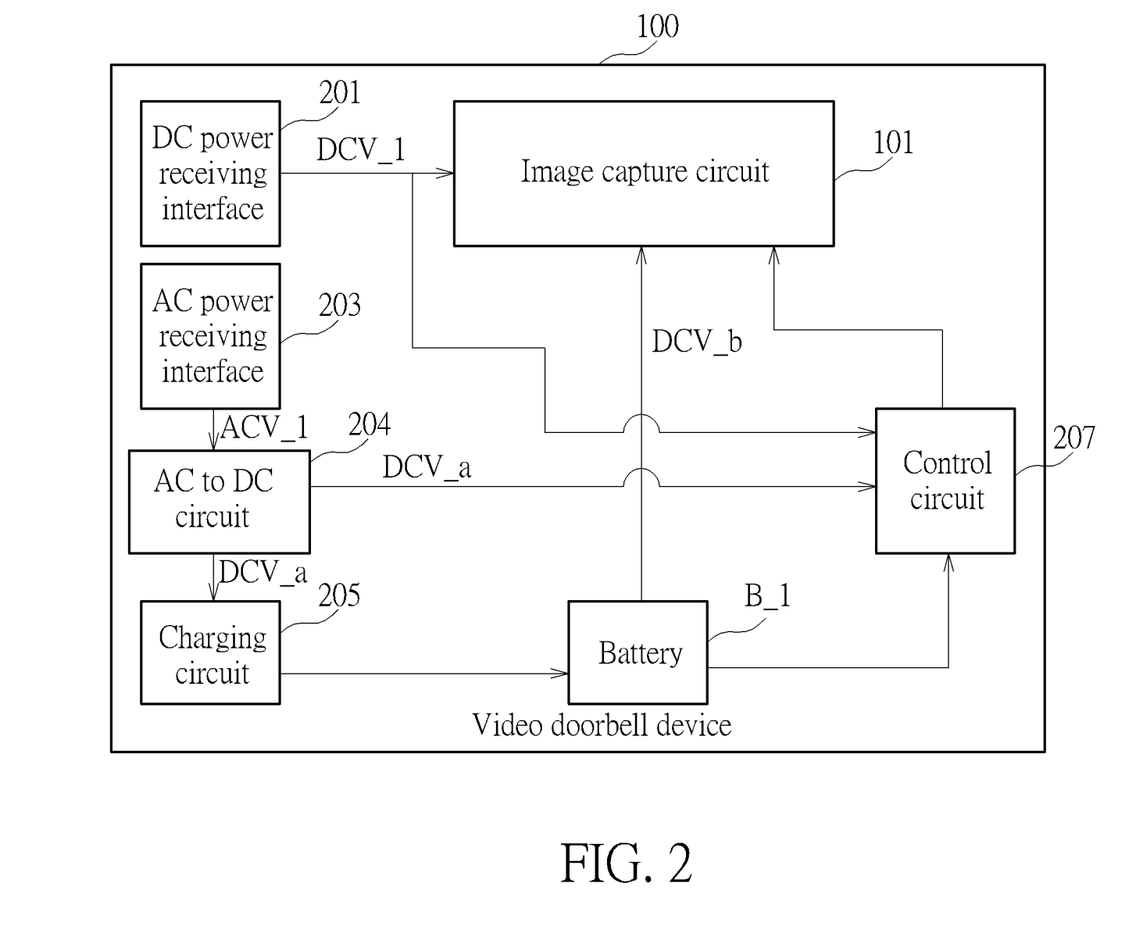
FIG. 2 is a block diagram illustrating a video doorbell device according to one embodiment of the present invention.

FIG. 2 is a block diagram for a video doorbell device according to one embodiment of the present invention. As illustrated in FIG. 2, besides the image capture circuit 101, the video doorbell device 100 further comprises a DC power receiving interface 201, an AC power receiving interface 203, an AC to DC circuit 204, a charging circuit 205, a battery B_1, and a control circuit 207 (e.g. a processor). The image capture circuit 101 can be coupled to the battery B_1 and the DC power receiving 201. The control circuit 207 can be coupled to the battery B_1, the AC to DC circuit 204 and the DC power receiving 201 as well. Furthermore, the control circuit 207 can be coupled to the image capture circuit 101 to control its operation. The DC power receiving interface 201 is configured to receive the DC voltage DCV_1 if it's provided, and the AC power receiving interface 203 is configured to receive the AC voltage ACV_1 if it's provided. The AC voltage ACV_1 can be the output voltage of the transformer 105 in FIG. 1, but also can come from different AC voltage sources corresponding to different doorbell system circuits. The charging circuit 205 can drain the second DC voltage DCV_a to charge the battery B_1, e.g. when the image capture circuit 101 is in a sleep mode. The second DC voltage DCV_a is generated by converting the AC voltage ACV_1 via the AC to DC circuit 204 in FIG. 2. The DC power receiving interface 201, the AC power receiving interface 203, the AC to DC circuit 204, and the charging circuit 205 as a whole can be viewed as a power circuit of the video doorbell device 100. The power circuit can charge the battery B_1 or drain power from battery B_1. The power circuit can use the power it receives from the battery B_1 or received through the DC power receiving interface 201 or the AC power receiving interface 203 to provide system power to the image capture circuit 101, the control circuit 207, and other internal circuit components of the video doorbell device 100.

The image capture circuit 101 can selectively drain the DC voltage DCV_1 from the DC power receiving interface 201 or the DC voltage DCV_b from the battery B_1 to operate. The control circuit 207 can selectively drain the DC voltage DCV_1 from the DC power receiving interface 201, or the DC voltage DCV_b from the battery B_1, or the DC voltage DCV_a from the AC to DC circuit 204 to operate. Also, the control circuit 207 can detect whether the video doorbell device 100 is connected to an AC voltage source or not, and accordingly controls the operations of other components of the video doorbell device 100. For example, if the video doorbell device 100 is connected to the AC voltage source, the control circuit 207 controls the charging circuit 205 to charge the battery B_1 while necessary. Oppositely, if the video doorbell device 100 is not connected to the AC voltage source, the control circuit 207 can control the image capture circuit 101 to drain the DC voltage DCV_1 or the DC voltage DCV_b to operate.

For the convenience of explaining, some components of the video doorbell device 100 are not illustrated. For example, the video doorbell device 100 can comprise a communication circuit configured to transmit videos, audios or messages to a user's electronic device. In addition, the video doorbell device 100 can comprise a DC voltage converting circuit configured to convert the DC voltage DCV_1 or the internal DC voltage DCV_b to a DC voltage which the image capture circuit 101 needs. Furthermore, the video doorbell device 100 can further comprise a motion sensor such as a passive IR sensor, which can trigger automatic video recording or photographing if someone approaches the video doorbell device 100.

Figure 3:
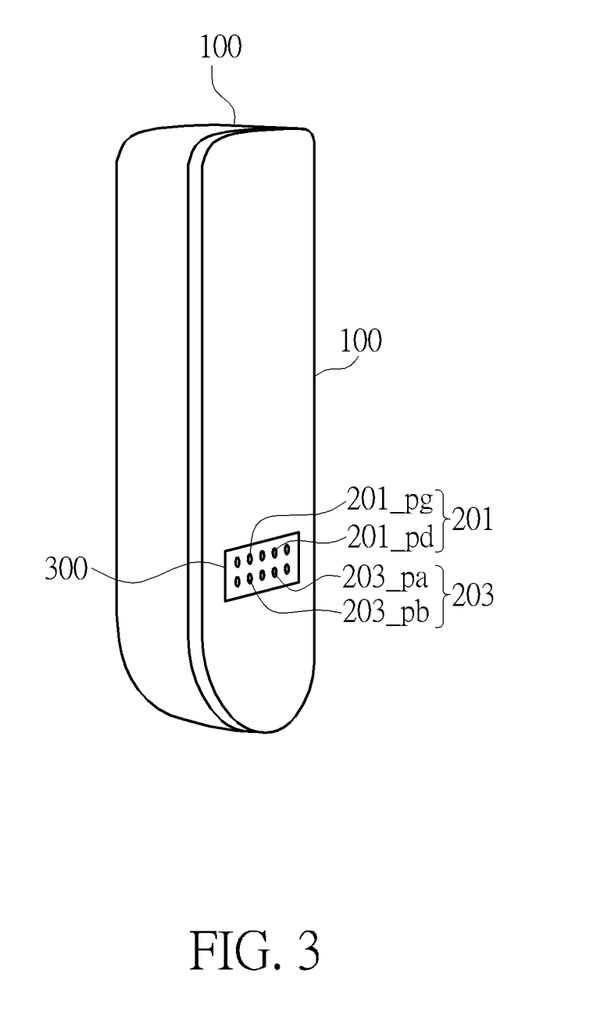
FIG. 3 is a schematic diagram illustrating pins of a video doorbell device according to one embodiment of the present invention.

In one embodiment, the DC power receiving interface 201 and the AC power receiving interface 203 respectively comprises at least one connector pin. FIG. 3 is a schematic diagram illustrating pins of a video doorbell device according to one embodiment of the present invention. As shown in FIG. 3, the back side of the video doorbell device 100 comprises a connector port 300, and the connector port 300 comprises a DC pin 201_pd, a ground pin 201_pg, and a first AC pin 203_pa, and a second AC pin 203_pb. The DC pin 201_pd and the ground pin 201_pg can be viewed as the DC power receiving interface 201; the first AC pin 203_pa and the second AC pin 203_pb can be viewed as the AC power receiving interface 203. It should be noted, however, the configuration and the number of the pins provided by the present invention are not limited to the example illustrated in FIG. 3.

In addition to the pins illustrated in FIG. 3, the connector port 300 may further comprise other pins. For example, in one embodiment, the connector port 300 may further comprise at least one of the following pins: an information receiving pin served as an information receiving interface, and an accessory detecting pin served as an accessory detecting interface. In one embodiment, the information receiving pin may further comprise a pin receiving battery information and a pin receiving other information. The accessories connected to the video doorbell device 100 can also comprise corresponding pins, and the details of these pins will be explained in following descriptions.

The accessories ACE_1, ACE_2, ACE_3 for the video doorbell device provided by the present invention will be described below. In addition to being electrically connectable to the video doorbell device 100, any of these accessories can also be used as a surface mount for the video doorbell device 100, thereby the video doorbell device 100 can be installed on a flat surface such as a wall/door frame or the like.

Figure 4:
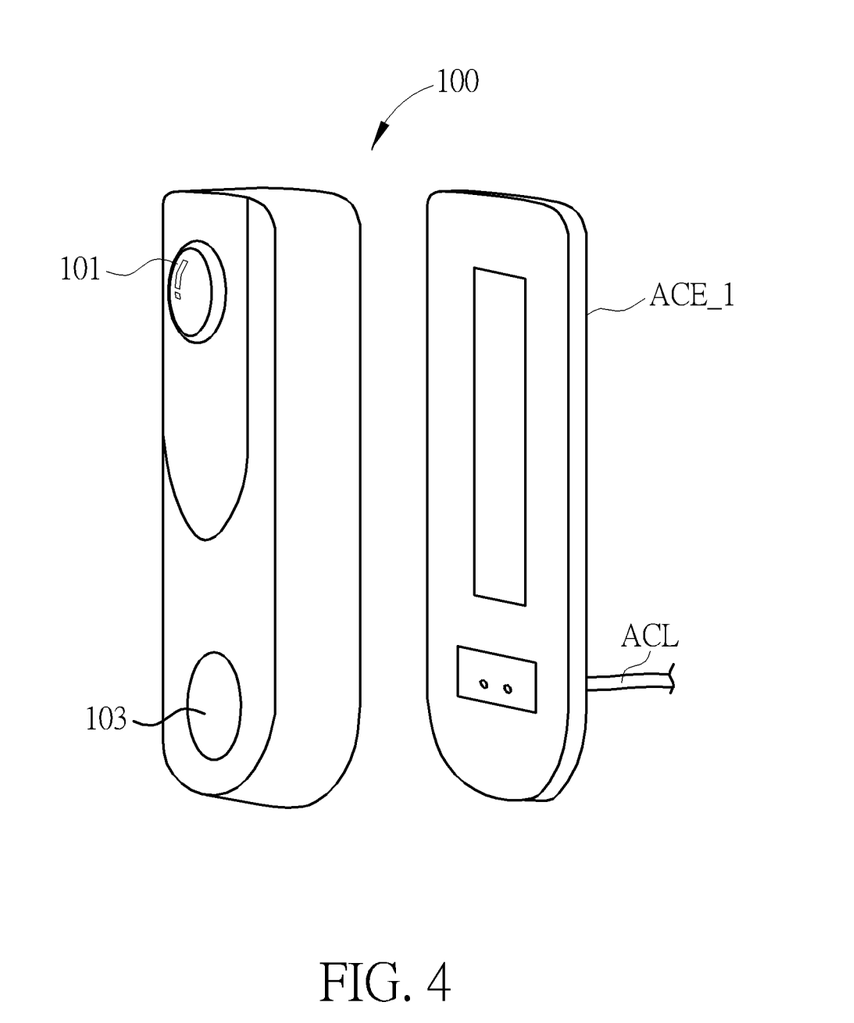
FIG. 4 is a schematic diagram illustrating a video doorbell device with an accessory according to one embodiment of the present invention.

FIG. 4 is a schematic diagram illustrating a video doorbell device with an accessory ACE_1 according to one embodiment of the present invention. As illustrated in FIG. 4, the AC line ACL in FIG. 1 can be coupled to the connection port of the accessory ACE_1, and then the AC power receiving interface 203 of the video doorbell device 100 can be coupled to another connection port of the accessory ACE_1, thereby the video doorbell device 100 can receive the AC voltage ACV_1. The video doorbell device 100 can be assembled to the accessory ACE_1 by a combination component (e.g. a screw) or without a combination component. After the accessory ACE_1 is installed by a technician, the user can easily install the video doorbell device 100 to the accessory ACE_1 or remove the video doorbell device 100 from the accessory ACE_1.

Figure 5:
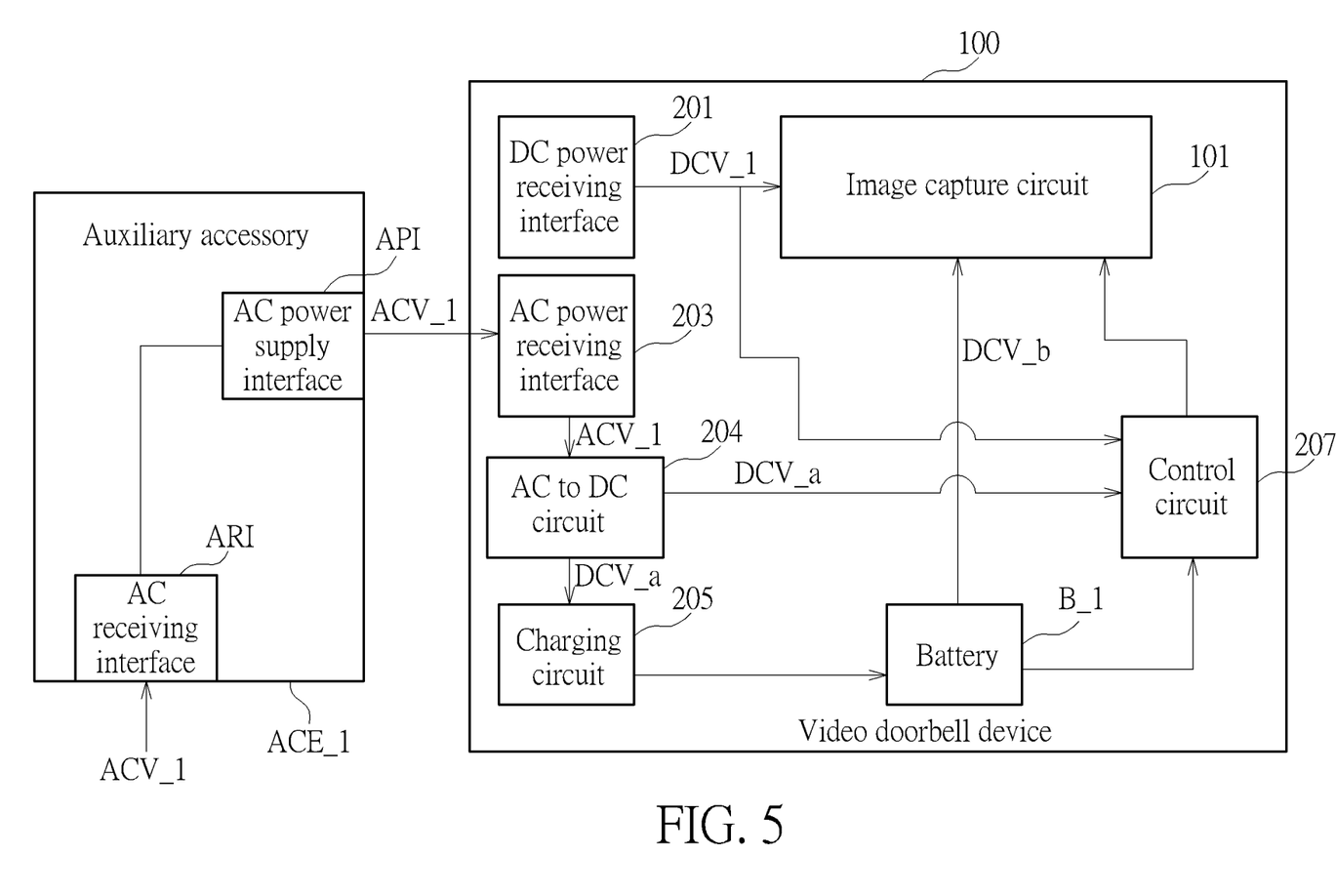
FIG. 5 is a block diagram illustrating a video doorbell device with an accessory according to another embodiment of the present invention.

FIG. 5 is a block diagram illustrating a video doorbell device with an accessory ACE_1 according to one embodiment of the present invention. As shown in FIG. 5, the accessory ACE_1 comprises an AC power supply interface API and an AC receiving interface ARI. The AC receiving interface ARI receives the AC voltage ACV_1, and the AC power supply interface API outputs the AC voltage ACV_1 to the AC power receiving interface 203. In one embodiment, the AC power supply interface API and the AC power receiving interface ARI respectively comprises a plurality of pins. When the accessory ACE_1 is used, if the image capture circuit 101 is in the sleep state, the charging circuit 205 can drain the DC voltage DCV_a to charge the battery B_1. Oppositely, when the image capture circuit 101 is in the work state, it can drain power from the internal DC voltage DCV_b to operate. The control circuit 207 can detect whether the video doorbell device 100 is connected to an AC voltage source and thereby controls the operations of other components of the video doorbell device 100.

Figure 6:
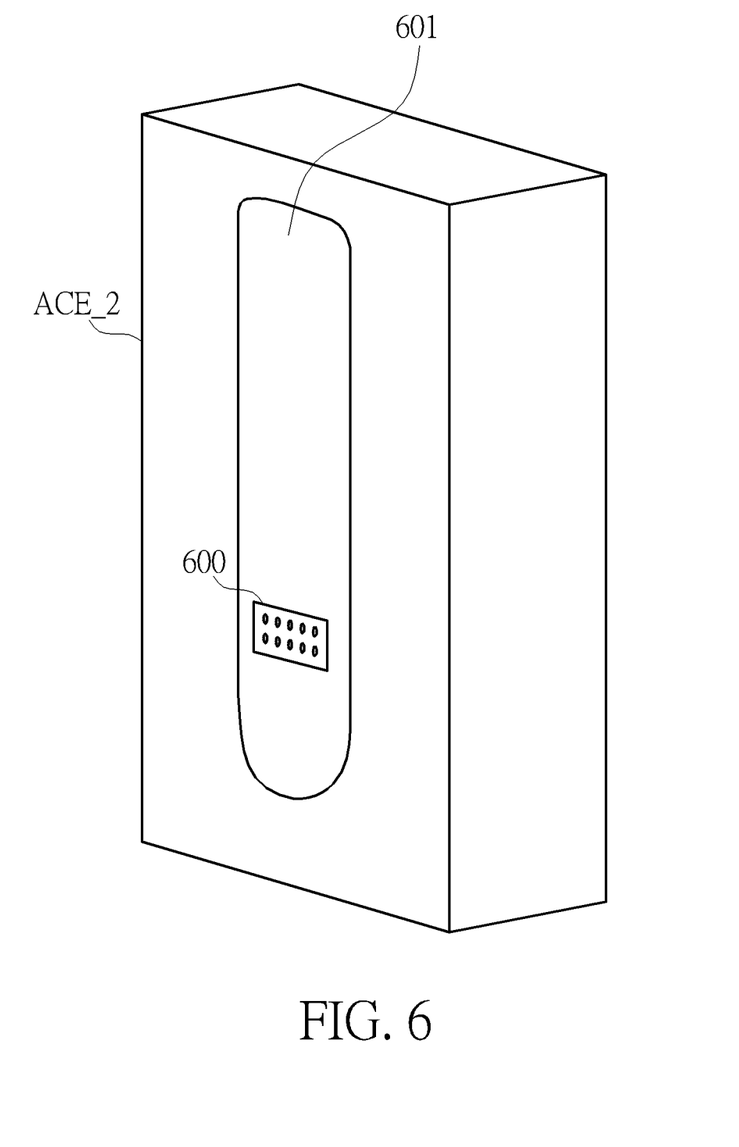
FIG. 6 and FIG. 7 are respectively schematic diagrams illustrating a video doorbell device with an accessory according different embodiments of the present invention.
Figure 7:
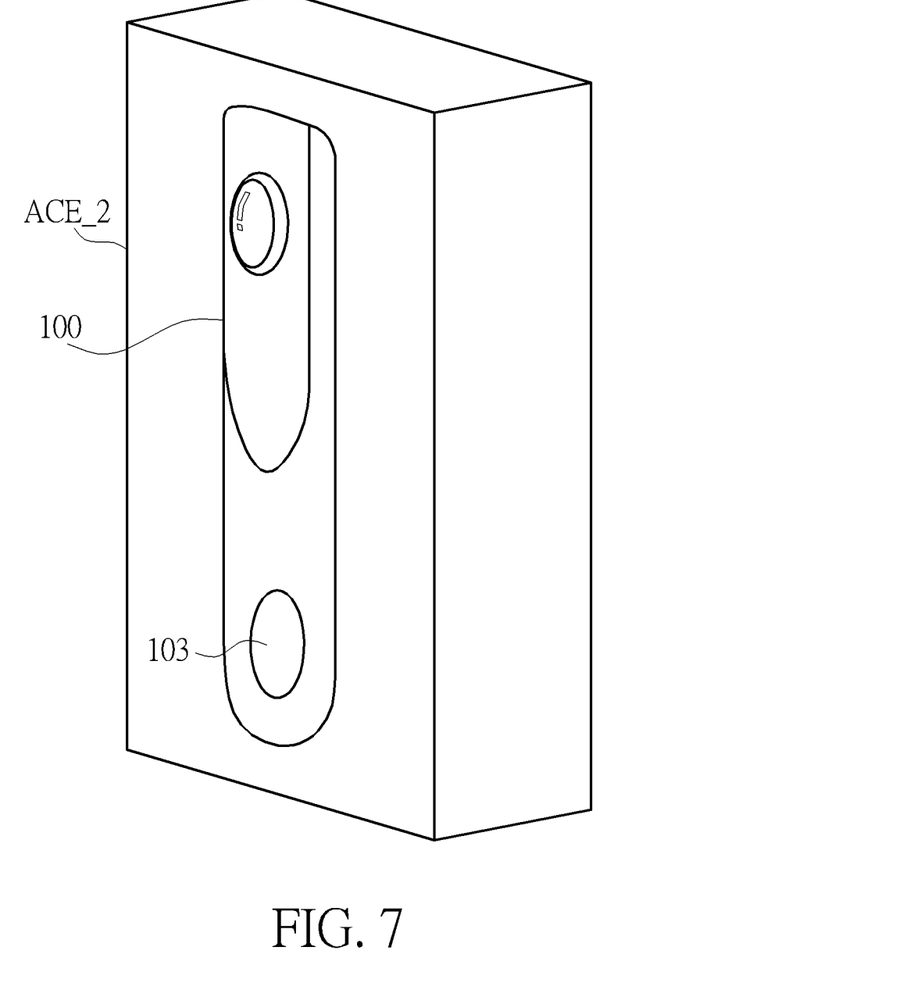

FIG. 6 and FIG. 7 are schematic diagrams illustrating a video doorbell device with an accessory ACE_2 according one embodiment of the present invention. As shown in FIG. 6, the accessory ACE_2 comprises a battery (not shown) and a DC power supply interface 600. The DC power supply interface 600 can be coupled to the DC power receiving interface 201 of the video doorbell device 100 to provide the DC voltage DCV_1. The accessory ACE_2 can comprise a notch 601 into which the video doorbell device 100 can be combined. FIG. 7 illustrates an example in which the video doorbell device 100 is combined to the accessory ACE_2. In the embodiments of FIGS. 6 and 7, the video doorbell device 100 may use a wireless chime rather than the chime 107 shown in FIG. 1.

Figure 8:
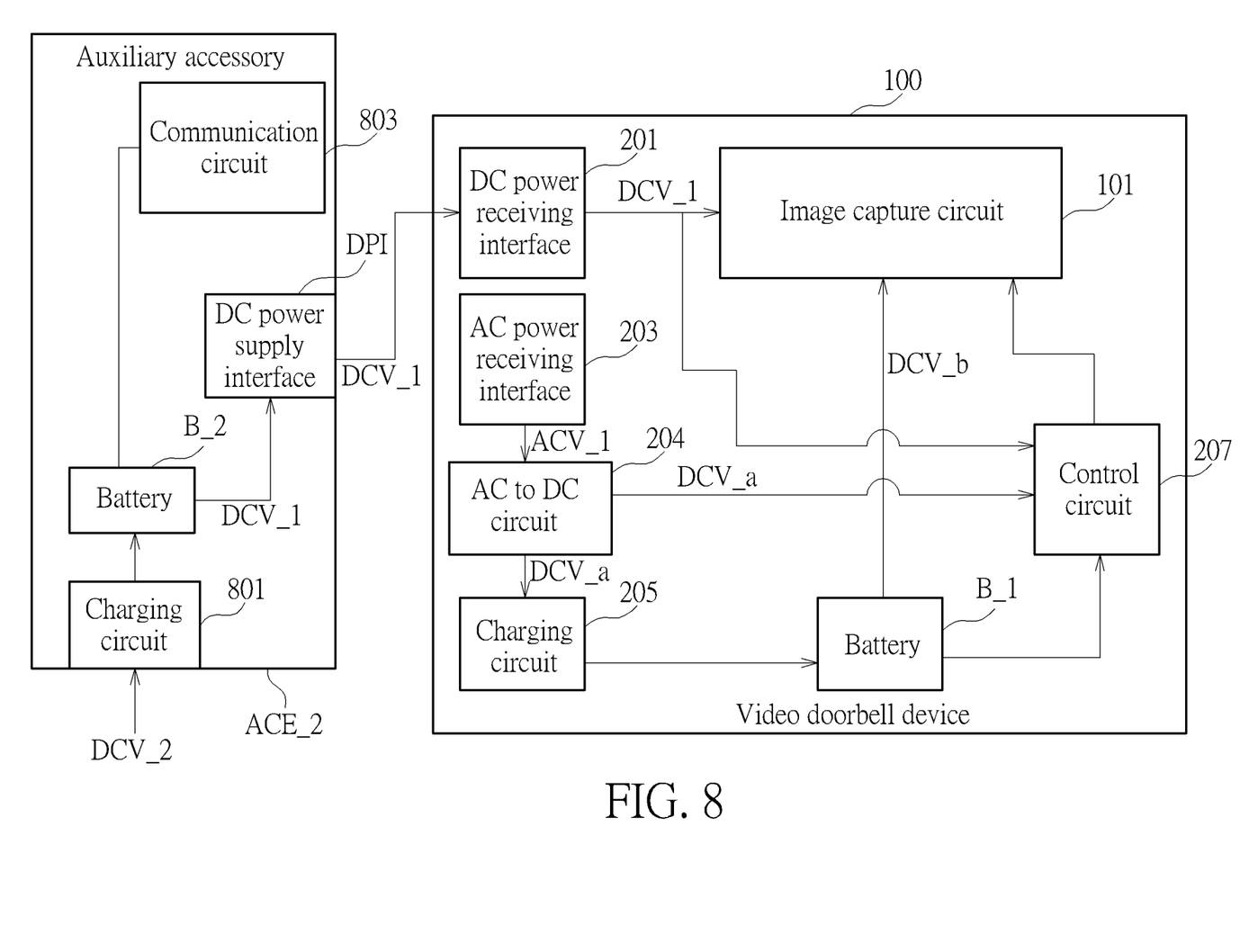
FIG. 8 is a block diagram illustrating a video doorbell device with an accessory according to another embodiment of the present invention.

FIG. 8 is a block diagram illustrating a video doorbell device with an accessory ACE_2 according to another embodiment of the present invention. As illustrated in FIG. 8, the accessory ACE_2 comprises a battery B_2 and a DC power supply DPI (for example, the aforementioned DC power supply interface 600). The DC power supply DPI is coupled to the battery B_2 and coupled to the DC power receiving interface 201 to output the DC voltage DCV_1 provided by the battery B_2. In one embodiment, the battery B_2 is a rechargeable battery, and in such embodiment, the accessory ACE_2 may further comprise a charging circuit 801 for charging the battery B_2. The charging circuit 801 can be a charging circuit that receives the DC voltage DCV_2 (e.g. a USB charging circuit), but can be other types of charging circuits as well.

In one embodiment, the accessory ACE_2 further comprises a communication circuit 803 configured to transmit information related to the accessory ACE_2 or the video doorbell device 100. For example, when the communication circuit (e.g. a WiFi communication circuit) in the video doorbell device 100 is in a sleep state, the communication circuit 803 can transmit the power information of the battery B_1 or the battery B_2 to the user's electronic device (e.g. 109). Alternatively, the communication circuit 803 can transmit a keep alive command on behalf of the video doorbell device 100, and may also wake up the video doorbell device 100 after receiving the wake up command. The communication circuit 803 can be a low power circuit (for example, a communication circuit such as Zigbee, Zwave, and DECT ULE that consumes less power than WiFi). By this way, the power consumption for the video doorbell device 100 in the sleep state can be reduced.

The advantage of using the accessory ACE_2 is, in some situations, the battery B_1 of the video doorbell device 100 may not be successfully charged, and thus the image capture circuit 101 may not function properly. In such situation, the accessory ACE_2 can be utilized to allow the video doorbell device 100 to function properly. Moreover, if the accessory ACE_2 is used, since the accessory ACE_2 and the video doorbell device 100 may not be connected to the AC line ACL shown in FIG. 1, the user can move the video doorbell system to any needed position rather than limited to a specific position at which the video doorbell device 100 can be connected to the AC line ACL.

Figure 9:
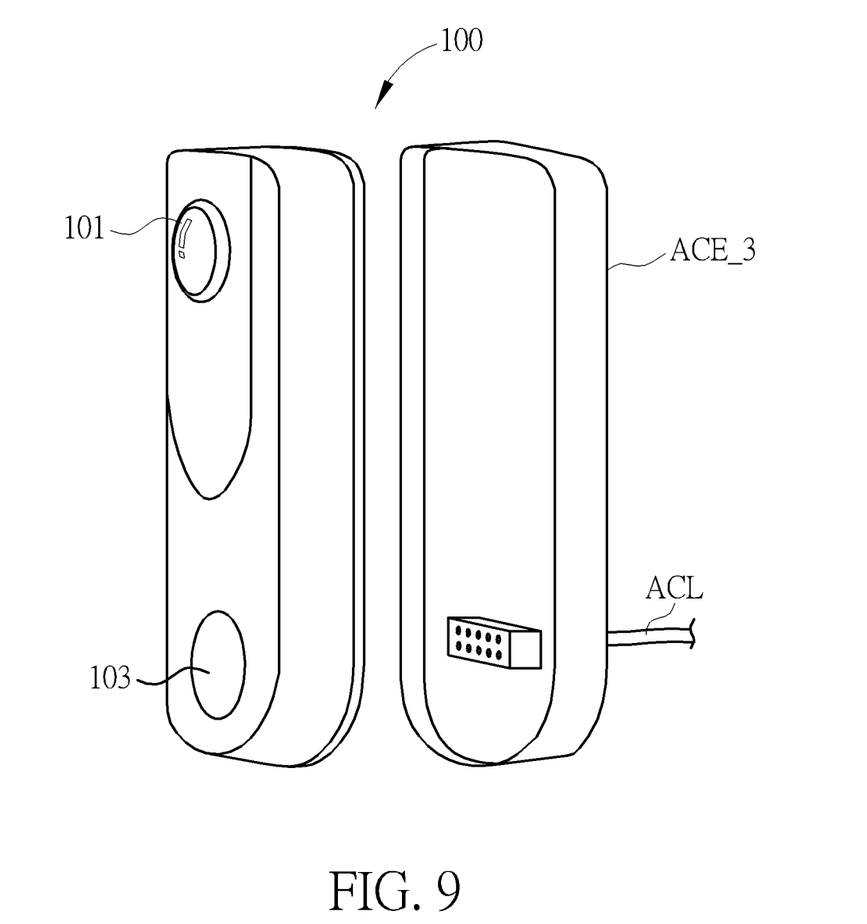
FIG. 9 is a schematic diagram illustrating a video doorbell device with an accessory according to still another embodiment of the present invention.

FIG. 9 is a schematic diagram illustrating a video doorbell device with an accessory ACE_3 according to still another embodiment of the present invention. As shown in FIG. 9, the AC line ACL in FIG. 1 can be coupled to the AC receiving interface (not shown in FIG. 9) of the accessory ACE_3, and then the DC power receiving interface 201 and the AC power receiving interface 203 of the video doorbell device 100 can be coupled to the AC/DC power supply interface (not shown in FIG. 9) of the accessory ACE_3. By this way, the video doorbell device 100 may receive the AC voltage ACV_1 and the DC voltage DCV_1.

Figure 10:
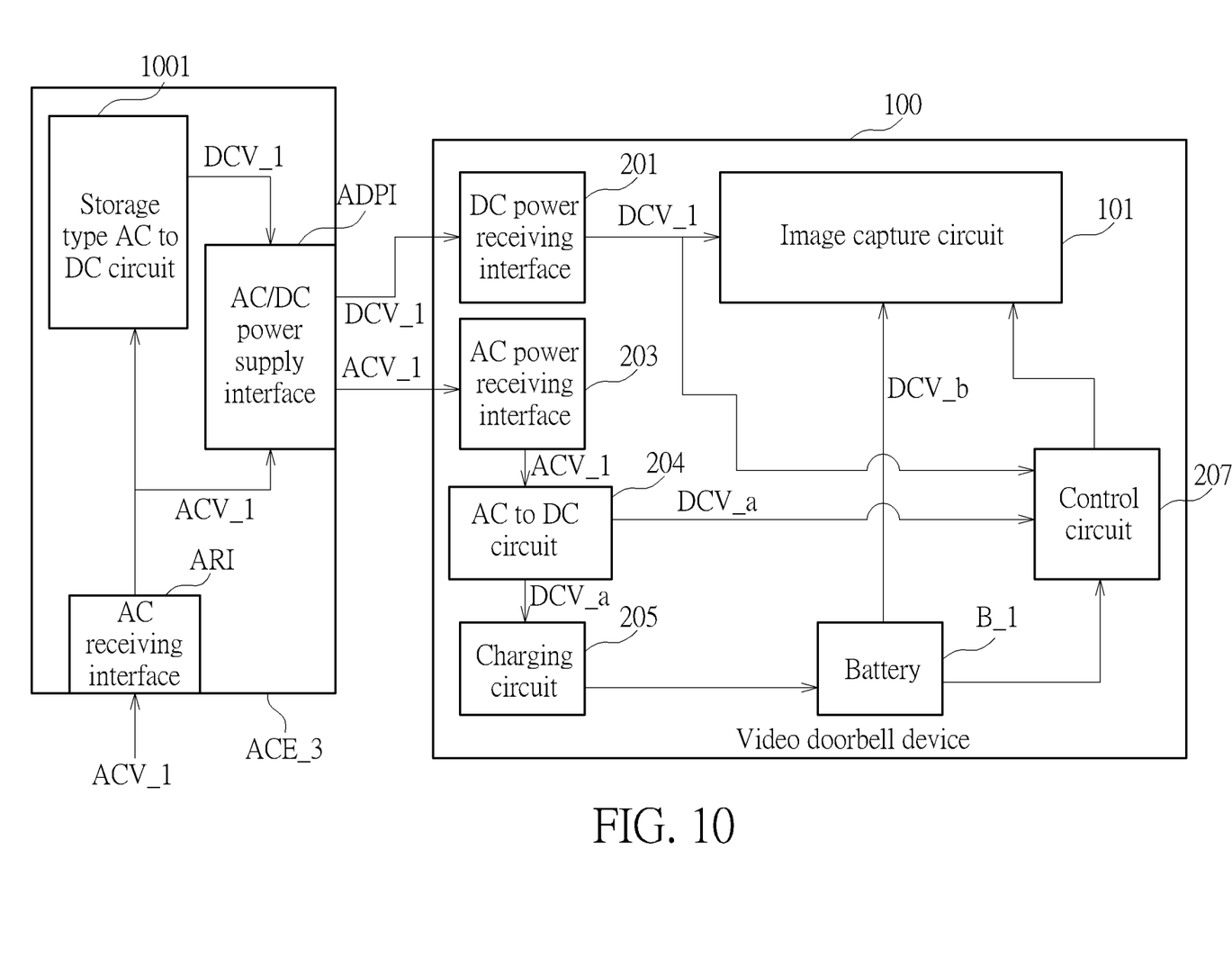
FIG. 10 is a block diagram illustrating a video doorbell device with an accessory according to still another embodiment of the present invention.

FIG. 10 is a block diagram illustrating a video doorbell device with an accessory ACE_3 according to still another embodiment of the present invention. As shown in FIG. 10, the accessory ACE_3 comprises a storage type AC to DC circuit 1001, an AC receiving interface ARI, and an AC/DC power supply interface ADPI. The AC receiving interface ARI is configured to receive the AC voltage ACV_1. The storage type AC to DC circuit 1001 is configured to convert the AC voltage ACV_1 to a DC voltage DCV_1. In one embodiment, the storage type AC to DC circuit 1001 can temporarily store the power after converting the AC voltage ACV_1 into the DC voltage DCV_1, and provides the stored power to the AC/DC power supply interface ADPI when needed. The AC/DC power supply interface ADPI is coupled to the DC power receiving interface 201 and the AC power receiving interface 203, to output the AC voltage ACV_1 to the AC power receiving interface 203 and the output DC voltage DCV_1 to the DC power receiving interface 201. In one embodiment, the AC receiving interface ARI and the AC/DC power supply interface ADPI respectively comprises a plurality of pins corresponding to the pins of the video doorbell device 100.

In one embodiment, when the image capture circuit 101 is in the work state, the image capture circuit 101 by default uses the DC voltage DCV_1 provided by the storage type AC to DC circuit 1001. When the storage type AC to DC circuit 1001 cannot supply the DC voltage DCV_1 (for example, when the temporary stored power is exhausted), the internal DC voltage DCV_b provided by the battery B_1 is used.

The advantage of using the accessory ACE_3 is that when the image capture circuit 101 is in the work state, the DC voltage DCV_1 provided by the storage type AC to DC circuit 1001 is used by default, so that the image capture circuit 101 still function properly when the battery B_1 cannot be normally charged. In addition, since the image capture circuit 101 by default uses the DC voltage DCV_1 provided by the storage type AC to DC circuit 1001, the number of times of charging and discharging of the battery B_1 can be reduced to extend the life of the battery B_1.

Figure 11:
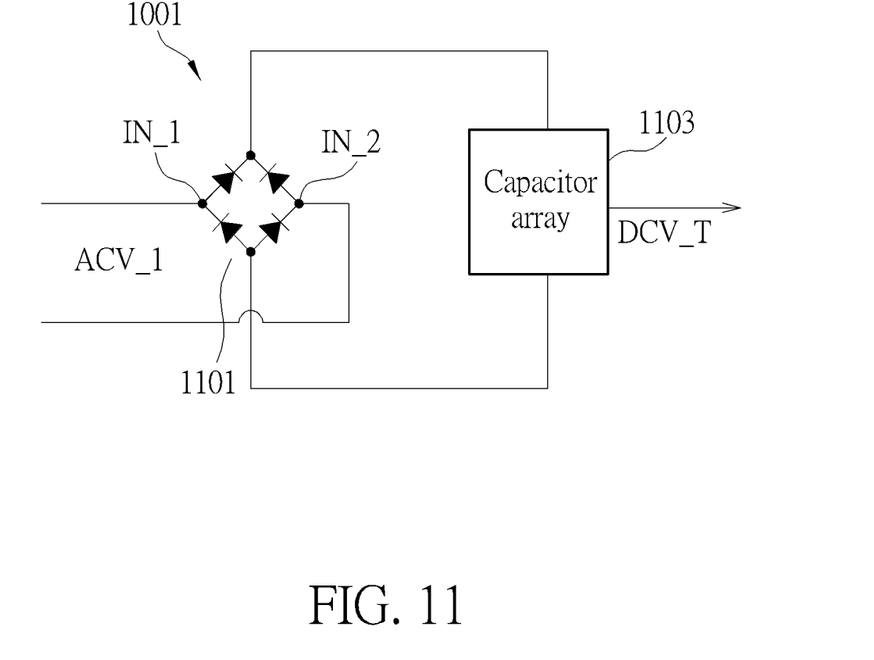
FIG. 11 is a schematic diagram illustrating an example of the storage type AC to DC circuit in FIG. 10, according to one embodiment of the present invention.

FIG. 11 is a schematic diagram illustrating an example of the storage type AC to DC circuit 1001 in FIG. 10, according to one embodiment of the present invention. As shown in FIG. 11, the storage type AC to DC circuit 1001 comprises a bridge rectifier 1101 and a capacitor array 1103. The bridge rectifier 1101 receives the AC voltage ACV_1 and charges the capacitor array 1103 to generate a converted DC voltage DCV_T. The converted DC voltage DCV_T can be directly used as the DC voltage DCV_1. In one embodiment, the storage type AC to DC circuit 1001 further comprises a DC to DC converter to convert the converted DC voltage DCV_T to the DC voltage DCV_1.

As above-mentioned descriptions, the connector port 300 of the video doorbell device 100 in FIG. 3 may further comprise other pins. For example, in one embodiment, the connector port 300 further comprises at least one of the following pins: an information receiving pin served as an information receiving interface, and an accessory detecting pin served as the accessory detecting interface.

In one embodiment, the information receiving pin can be used to receive battery information (e.g. battery capacity, battery temperature, battery voltage, etc.) from the accessory ACE_2. In this case, the DC power supply interface DPI of the accessory ACE_2 can also comprise a corresponding information receiving pin, which can receive information besides the battery information. As described above, the accessory ACE_2 can comprise a communication circuit 803 configured to transmit information related to the accessory ACE_2 or the video doorbell device 100, such as transmitting keep alive message or a wake up command. In one embodiment, if the image capture circuit 101 enters a sleep state, the communication circuit of the video doorbell device 100 also enters the sleep state and cannot receive the wake up command. In this case, the wake up command can be received by the communication circuit 803, and then the control circuit (not shown) of the accessory ACE_2 can notify the video doorbell device 100 through the information receiving pin to wake up the image capture circuit 101. In one embodiment, the connector port 300 of the video doorbell device 100 may comprise a plurality of information receiving pins for receiving different information, and the accessory ACE_2 may correspondingly comprise a plurality of information receiving pins.

The accessory detecting pin is configured to receive the accessory information from the accessory, and the control circuit 207 in the video doorbell device 100 determines the type of the accessory based on the accessory information. In one embodiment, via setting the circuit structure of the accessory, the accessory detecting pin can have different voltages when the video doorbell device 100 is coupled to different accessories, and the control circuit 207 can determine which accessory is coupled according to the voltage. For example, the circuit structure of the accessories ACE_1, ACE_2, and ACE_3 are set such that the accessory detection pins have voltages A, B, and C respectively when the video doorbell device 100 is coupled to the accessories ACE_1, ACE_2, and ACE_3. Then, the control circuit 207 can determine which one of the accessories ACE_1, ACE_2, and ACE_3 is the video doorbell device 100 coupled to according to the voltage of the accessory detecting pin. After determining which accessory the video doorbell device 100 is coupled to, the control circuit 207 can control the video doorbell device 100 to perform a corresponding operation. In above-mentioned embodiments, the accessories ACE_1, ACE_2, and ACE_3 may respectively have corresponding accessory detecting pins.

In one embodiment, the accessory ACE_2 may further comprise an AC pin, such that the control circuit 207 can determine which accessory is coupled according to the accessory information and the voltage of the AC pin. For example, when the video doorbell device 100 is coupled to the accessory ACE_2, the voltage of the AC pin of the video doorbell device 100 is X, and when the video doorbell device 100 is coupled to the accessory ACE_3, the voltage of the AC pin of the video doorbell device 100 is Y. With reference to the above-mentioned embodiments, when the accessory detecting pin has a voltage B and the AC pin has a voltage Y, the control circuit 207 can determine that the video doorbell device 100 is coupled to the accessory ACE_2. When the accessory detecting pin has a voltage C and the AC pin has a voltage Y, the control circuit 207 can determine that the video doorbell device 100 is coupled to the accessory ACE_3.

In view of above-mentioned embodiments, the user can use different accessories corresponding to different situations, and the issue that the video doorbell device cannot function properly in some situations can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video doorbell system, comprising:
   an accessory;
   a video doorbell device, comprising:
      a chime trigger device;
      a first battery, configured to provide an internal DC voltage;
      an AC power receiving interface, configured to receive an AC voltage;
      an AC to DC circuit, coupled to the AC power receiving interface, configured to convert the AC voltage to a second DC voltage;
      a charging circuit, coupled to the AC to DC circuit and the first battery, configured to drain the second DC voltage to charge the first battery;
      a DC power receiving interface, configured to receive a first DC voltage from the accessory coupled to the video doorbell device, wherein the accessory, having a second battery or a storage type AC to DC circuit, can be used as a surface mount for the video doorbell device; and
      an image capture circuit, coupled to the first battery and the DC power receiving interface, configured to selectively drain the internal DC voltage or the first DC voltage to operate.

2. The video doorbell system of claim 1, wherein the video doorbell device further comprises:
   a control circuit;

an accessory detecting interface, configured to receive accessory information from the accessory coupled to the AC power receiving interface or the DC power receiving interface, wherein the control circuit determines a type of the accessory according to the accessory information; and an information receiving interface, configured to receive information from the accessory;

wherein the control circuit is configured to wake up the image capture circuit according to an wake up command received by the information receiving interface while the image capture circuit is in a sleep mode.

3. The video doorbell system of claim 2, wherein the control circuit determines the type of the accessory according to the accessory information and a voltage of the AC power receiving interface.

4. The video doorbell system of claim 1, wherein the accessory comprises:
   a second battery, configured to provide the first DC voltage; and
   a DC power supply interface, coupled to the second battery and the DC power receiving interface, such that the DC power receiving interface receives the first DC voltage via the DC power supply interface.

5. The video doorbell system of claim 4, wherein the second battery is a rechargeable battery and the accessory further comprises:
   a charging circuit, coupled to the second battery, configured to receive a third DC voltage to charge the second battery; and
   a communication circuit, configured to transmit related information of the accessory or the video doorbell device.

6. The video doorbell system of claim 1, further comprising:
   wherein the accessory comprises:
      an AC receiving interface, configured to receive the AC voltage;
      an AC/DC power supply interface, coupled to the AC power receiving interface and the DC power receiving interface, to output the AC voltage to the AC power receiving interface and to output the first DC voltage to the DC power receiving interface;
      a storage type AC to DC circuit, configured to convert the AC voltage to the first DC voltage.

7. The video doorbell system of claim 6, wherein if the image capture circuit is in a work state, the image capture circuit by default uses the first DC voltage provided by the storage type AC to DC circuit, and switches to use the internal DC voltage provided by the first battery if the storage type AC to DC circuit cannot provide the first DC voltage.

8. The video doorbell system of claim 6, wherein the storage type AC to DC circuit comprises:
   a capacitor array, configured to generate a converted DC voltage; and
   a bridge rectifier, configured to receive the AC voltage and to charge the capacitor array to generate the converted DC voltage;
   wherein the first DC voltage is generated from the converted DC voltage.

9. The video doorbell system of claim 1, wherein the video doorbell device further comprises:
   a control circuit; and
   a connector port, comprising:
      a DC pin;
      a ground pin, wherein the DC power receiving interface comprises the DC pin and the ground pin;
      a first AC pin;
      a second AC pin, wherein the AC power receiving interface comprises the first AC pin and the second AC pin;
      an information receiving pin, wherein the control circuit awakes the image capture circuit according to a wake up command received by the information receiving pin while the image capture circuit is in a sleep mode; and
      an accessory detecting pin, configured to receive accessory information from the accessory, wherein the control circuit determines a type of the accessory according to the accessory information.

10. The video doorbell system of claim 9, wherein the control circuit determines the type of the accessory according to the accessory information and a voltage of the AC power receiving interface.

11. A video doorbell device, comprising:
   a chime trigger device;
   a battery, configured to provide an internal DC voltage;
   an AC power receiving interface, configured to receive an AC voltage;
   an AC to DC circuit, coupled to the AC power receiving interface, configured to convert the AC voltage to a second DC voltage;
   a charging circuit, coupled to the AC to DC circuit and the battery, configured to drain the second DC voltage to charge the battery;
   a DC power receiving interface, configured to receive a first 15DC voltage from an accessory coupled to the video doorbell device, wherein the accessory, having a second battery or a storage type AC to DC circuit, can be used as a surface mount for the video doorbell device; and
   an image capture circuit, coupled to the battery and the DC power receiving interface, configured to selectively drain the internal DC voltage or the first DC voltage to operate.

12. The video doorbell device of claim 11, wherein the video doorbell device further comprises:
   a control circuit;
   an accessory detecting interface, configured to receive accessory information from the accessory coupled to the AC power receiving interface or the DC power receiving interface, wherein the control circuit determines a type of the accessory according to the accessory information; and
   an information receiving interface, configured to receive information from the accessory;
   wherein the control circuit is configured to wake up the image capture circuit according to an wake up command received by the information receiving interface while the image capture circuit is in a sleep mode.

13. The video doorbell device of claim 12, wherein the control circuit determines the type of the accessory according to the accessory information and a voltage of the AC power receiving interface.

14. The video doorbell device of claim 11, further comprising:
   a control circuit; and
   a connector interface, comprising:
      a DC pin;
      a ground pin, wherein the DC power receiving interface comprises the DC pin and the ground pin;
      a first AC pin;

a second AC pin, wherein the AC power receiving interface comprises the first AC pin and the second AC pin;

an information receiving pin, wherein the control circuit awakes the image capture circuit according to a wake up command received by the information receiving pin while the image capture circuit is in a sleep mode; and an accessory detecting pin, configured to receive accessory information from the accessory, wherein the control circuit determines a type of the accessory according to the accessory information.

15. The video doorbell device of claim 14, wherein the control circuit determines the type of the accessory according to the accessory information and a voltage of the AC power receiving interface.

16. A video doorbell system, comprising:
a video doorbell device, comprising:
   a chime trigger device;
   a first battery, configured to provide an internal DC voltage;
   an AC power receiving interface, configured to receive an AC voltage;
   an AC to DC circuit, coupled to the AC power receiving interface, configured to convert the AC voltage to a second DC voltage;
   a charging circuit, coupled to the AC to DC circuit and the first battery, configured to drain the second DC voltage to charge the first battery;
   a DC power receiving interface, configured to receive a first DC voltage; and
   an image capture circuit, coupled to the first battery and the DC power receiving interface, configured to selectively drain the internal DC voltage or the first DC voltage to operate;
wherein the video doorbell device further comprises:
a control circuit; and
a connector port, comprising:
   a DC pin;
   a ground pin, wherein the DC power receiving interface comprises the DC pin and the ground pin;
   a first AC pin;
   a second AC pin, wherein the AC power receiving interface comprises the first AC pin and the second AC pin;
   an information receiving pin, wherein the control circuit awakes the image capture circuit according to a wake up command received by the information receiving pin while the image capture circuit is in a sleep mode; and
   an accessory detecting pin, configured to receive accessory information from an accessory, wherein the control circuit determines a type of the accessory according to the accessory information.

17. A video doorbell device, comprising:
a chime trigger device;
a battery, configured to provide an internal DC voltage;
an AC power receiving interface, configured to receive an AC voltage;
an AC to DC circuit, coupled to the AC power receiving interface, configured to convert the AC voltage to a second DC voltage;
a charging circuit, coupled to the AC to DC circuit and the battery, configured to drain the second DC voltage to charge the battery;
a DC power receiving interface, configured to receive a first DC voltage; and
an image capture circuit, coupled to the battery and the DC power receiving interface, configured to selectively drain the internal DC voltage or the first DC voltage to operate;
wherein the video doorbell device further comprises:
a control circuit; and
a connector interface, comprising:
   a DC pin;
   a ground pin, wherein the DC power receiving interface comprises the DC pin and the ground pin;
   a first AC pin;
   a second AC pin, wherein the AC power receiving interface comprises the first AC pin and the second AC pin;
   an information receiving pin, wherein the control circuit awakes the image capture circuit according to a wake up command received by the information receiving pin while the image capture circuit is in a sleep mode; and
   an accessory detecting pin, configured to receive accessory information from an accessory, wherein the control circuit determines a type of the accessory according to the accessory information.

* * * * *